United States Patent
Gershberg et al.

[15] 3,703,722
[45] Nov. 21, 1972

[54] MOTION DETECTION SYSTEM WITH SPLIT-RING MONOSTATIC DOPPLER DETECTION

[72] Inventors: David N. Gershberg, North Rockville, Md.; Alex Y. Lee, Arlington, Va.

[73] Assignee: E-System, Inc., Dallas, Tex.

[22] Filed: June 2, 1971

[21] Appl. No.: 149,151

[52] U.S. Cl.............343/5 PD, 340/258 A, 343/7.7, 343/8
[51] Int. Cl................................................G01s 9/42
[58] Field of Search.......340/258 A; 343/5 PD, 7.7, 8

[56] References Cited

UNITED STATES PATENTS

3,394,373  7/1968  Makrancy......................343/8

*Primary Examiner*—T. H. Tubbesing
*Attorney*—James D. Willborn and Richards, Harris & Hubbard

[57] ABSTRACT

A motion detection system wherein an RF transmitter is connected through a split-ring doppler detector to a transmit/receive antenna. Both the RF transmitter and the antenna are connected to nodes on the split-ring detector to provide a matched and balanced system. Diode detectors are connected, in opposite directions, to the ring detector at points between the transmitter load and the antenna to insure desired transmitter injection to the diodes for sensitive receiver operation. The diode detectors connect through individual low-pass filters to the inputs of an AC coupled, active filter, amplifier, which amplifies the doppler return signal that has been conducted by the diode detectors, while rejecting unwanted doppler frequencies to reduce false alarms. A microwave band-pass filter is so positioned in the antenna line to further reduce false alarms by defining a specific radio frequency bandwidth. A self-test feature is provided in that the DC level at one or both detector diodes can be monitored. To further reduce false alarms a correlating detection system provides a back-up signal for the doppler detector.

16 Claims, 11 Drawing Figures

INVENTORS:
DAVID N. GERSHBERG
ALEX Y. LEE

*Richards, Harris & Hubbard*
ATTORNEYS

FIG. 3A

ALL LINE $Z_0 = \sqrt{2}$

ALL LINE $Z_0 = \sqrt{2}$

INVENTORS:
DAVID N. GERSHBERG
ALEX Y. LEE

ATTORNEYS

MOTION DETECTION SYSTEM WITH SPLIT-RING MONOSTATIC DOPPLER DETECTION

The present invention relates to motion detection systems which operate on the doppler principle, and, more particularly, to the extracting of the doppler component from a radio signal reflected from a moving intruder by means of a split-ring detector.

Motion detector systems of various types have been proposed in the prior art. One class of motion detector systems is the space alarm system. Space alarm systems are characterized by the transmitting of energy into the space of a chamber to be protected or the space surrounding an object to be protected, and subsequently receiving the portion of the transmitted energy that is reflected by the surroundings. An alarm is triggered upon detection of a disturbance in the reflected energy caused by an intruder within the area. One type of space alarm system operates on the doppler principle. This type of system detects a doppler frequency shift in radiation deflected from moving objects within the space. The present invention pertains to a space alarm system of the doppler type, and more particularly, to a doppler system in which the energy radiated is radio frequency electromagnetic radiation.

The most basic parameter in the optimization of any motion detection system is the attaining of the highest probability of detection of motion, with the lowest probability of false alarm. An important point in the system for optimization is in that portion which first acquires the signal carrying the motion information. In a doppler space alarm system, this point is in the detector which extracts the doppler signal from the received wave. An optimized detector will reliably detect the doppler signal while rejecting extraneous signals which can be confused with a motion generated doppler signal.

A motion detection system in accordance with the present invention will have a lower false alarm rate than existing systems of comparable complexity because beat frequency modulation percentage at a pair of diode detectors is independent of the transmitted power level when the beat results from a legitimate doppler return. However, beat modulation percentage due to interference decreases as the transmitter power is increased, thereby improving the doppler-to-interference ratio. Also, utilization of high level detection eliminates the requirements for an expensive, low l/f noise doppler preamplifier that is usually found in doppler systems.

In many applications, motion detection systems are called upon to protect an extended area. In protecting such areas, certain problems are encountered. For example, a single unit of an alarm system which is sensitive to intruders at great distances from the antenna usually has an excessively high probability of responding to extraneous disturbances which originate nearer the antenna of the unit. On the other hand, a unit designed to have a more uniform sensitivity both near and far from an antenna is more likely to respond to disturbances originating beyond the confines of the area being protected. Therefore, for the uniform coverage of an extended area, it is generally desirable to employ a plurality of units distributed about the area to be protected. Furthermore, the area being protected frequently covers many separate rooms which also must be protected by separate units. Therefore, it is important not only to provide great reliability in such a detection system, but to provide one which is compact, low in cost, and which can be manufactured easily in large quantities to very high tolerances.

Additional advantages of the system arise out of its total simplicity. The circuit is easily reproduced and the limited number of parts required makes the system both reliable and economical. The RF circuitry provides a self-testing feature in that the DC level at one or both detector diodes can be monitored.

In RF doppler systems, it is generally desirable to employ a single transmit/receive antenna because of size, simplicity, cost and reliability. The circuits of such systems must, however, be capable of supplying continuous wave power to the antenna, while simultaneously extracting information from a relatively weak doppler return signal. The frequency difference between the transmitted signal and the doppler return signal is relatively low, usually sub-audible and lies within a range which is highly susceptible to noise. Conventional methods differentiating between the outgoing and incoming energy usually employ complex low l/f noise doppler frequency preamplifiers. Such arrangements encounter difficulties in alarm system applications with regard to interfering signals, have resulted in difficulty in achieving a balanced input to the mixer stage, have further resulted in exceptionally high losses in power and the transmitter power is limited by the mixer diodes. These arrangements are also more costly, complex and less reliable than the present invention.

It is an object of the present invention to provide an RF doppler detector for a motion detection system which has high sensitivity to doppler signals produced by motion, but which has high rejection of certain extraneous modulations on the carrier signal. It is a further object of the present invention to provide a detector for a motion detection system which does not require a complex doppler frequency preamplifier and is low in cost, high in reliability, and can be easily duplicated to high tolerances in quantity. It is a further object of this invention to provide an RF detector that can handle increased transmitter power, using low cost diodes to improve receiver range.

The present invention takes into account that disturbances in the field of a matched transmitter antenna affects the impedance of the antenna and contributes some reflection which will appear as an impedance disturbance in a special split-ring mixer circuit. A moving object in the antenna field reflects a doppler shifted signal which contributes a very small rippling or time varying impedance which is detected by the ring, demodulated, and applied to the doppler amplifier.

The present invention is predicated in part on the concept of extracting the doppler frequency component of the reflected signal from this rippling impedance on the split-ring mixer caused by the oppositely traveling transmitted wave and received wave as reflected from a moving object and bearing doppler modulation. The present invention achieves this by coupling two diode detectors to the split-ring at nodes such that desired transmitter power is coupled to the detectors to achieve the greatest receiver sensitivity and to differentially compare the detected outputs to extract the doppler signal. The differential detection is provided by employing, as the detectors, oppositely directed matched diodes which connect to the inputs of an operational amplifier. The coupling of the detectors is arranged to minimize the creation of a standing wave on the split-ring mixer.

Further provided is a band-pass filter connected to the transmission line between the split-ring mixer and the antenna. This helps reduce false alarms by restricting RF bandwidth of the system.

Another advantage of the present invention is that it provides a detector which is able to detect very weak doppler signals of low frequency, and which is insensitive to certain interferences, as for example, amplitude modulation on a transmitted signal of the type caused by the power supply ripple. Such modulation will not cause interfering signals since they affect the two detectors equally and are therefore cancelled in detection. Furthermore, the modulation of the transmitted signal itself which lies outside of the doppler pass-band will be rejected. Also external RF signals, containing modulation components, which do not beat into the doppler pass-band will be rejected by the balanced detectors.

The split-ring mixer provides balanced mixing to reject noise carried on the transmitter output. It also provides a means of supplying power to an antenna while simultaneously receiving return doppler signals on the same antenna (monostatic system). It provides a means of adjusting diode injection voltage to the desired value for a wide range of available transmitter powers. It utilizes power effectively, i.e., an increase in power is accompanied by an increase in doppler beat modulation percentage at the diodes, provided they are moved closer together to maintain a constant injection level.

A more complete understanding of the invention and its advantages will be apparent from the specification and claims and from the accompanying drawings illustrative of the invention.

Figure 1:
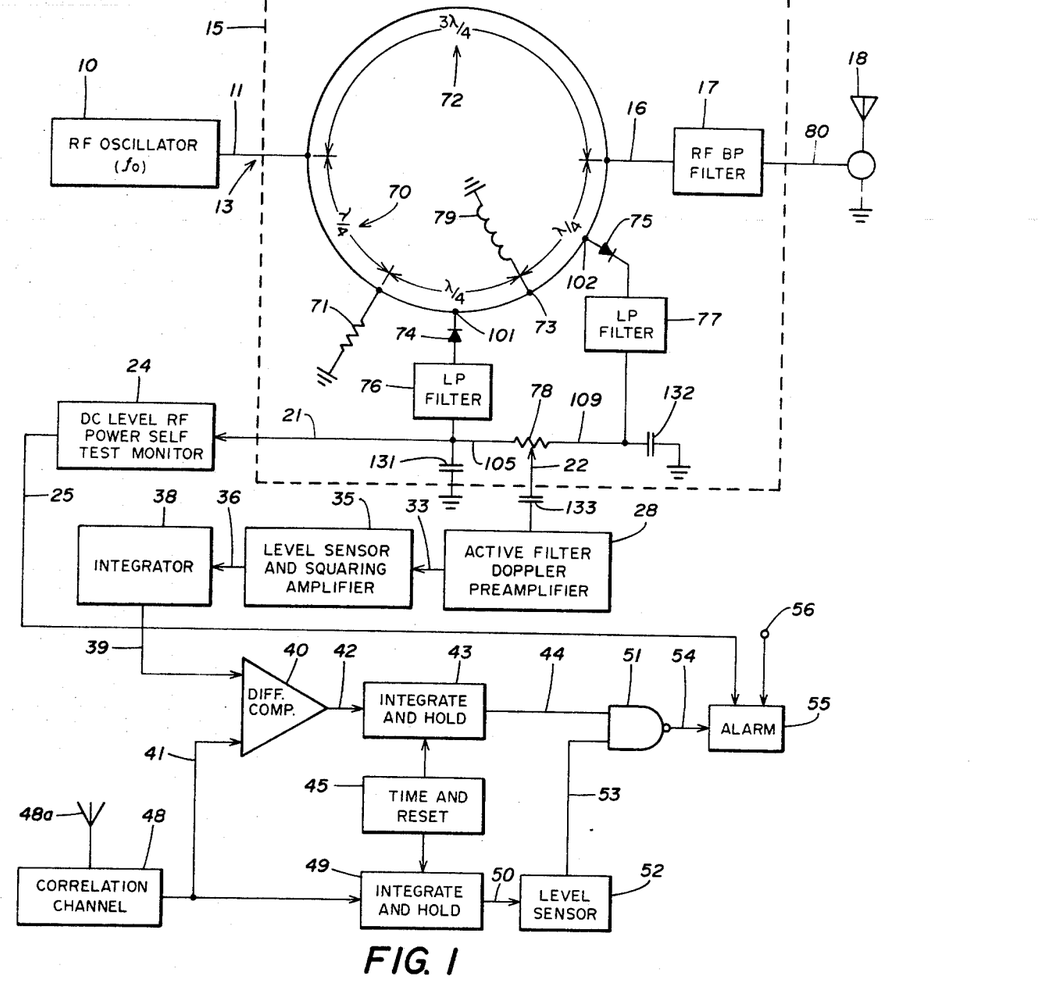
FIG. 1 is a block diagram of a radio frequency motion detection system employing a split-ring doppler detector.

Referring to FIG. 1, a radio frequency transmitter oscillator 10 is provided, having an output 11 connecting to the input 13 of a split-ring detector mixer 15. The RF output on line 16 from the mixer 15 is connected through an RF band-pass filter 17 to the transmit/receive antenna 18. The mixer 15 is provided with two outputs, a first output on line 21 carries a signal which indicates the presence of RF power from the transmitter, and a second output on line 22 which carries the doppler component of the received signal, that is, a signal representing the difference between the transmitted and received RF signals.

The signal at the output line 21 is a DC signal proportional to the level of the RF power from the oscillator 10. This signal is detected by a DC level RF monitor 24 which generates an alarm signal at its output on line 25 if the RF signal falls below a certain prescribed magnitude.

The output on line 22 is connected to an input of a doppler, active filter, preamplifier 28. This active filter, preamplifier 28 defines the accepted band width of the doppler signal.

The sinusoidal doppler signal at the output on line 33 of the active filter, preamplifier 28 is fed through a level sensor and squaring amplifier 35 where the signal is amplified and clipped to a square wave of the doppler frequency. This square wave appears at the output 36 of the squaring amplifier 35. The output of the amplifier 35 is fed to an input of an integrator 38. The output of the integrator 38 is connected to the input 39 of the differential comparator 40. An input 41 to the differential comparator 40 is also provided to allow operation with a correlation channel 48 to further reduce false alarms.

In the system of FIG. 1 as described to this point, the active filter doppler preamplifier 28 consists of an active filter input to a transistorized amplifier. Such filter-preamplifier combinations are commercially available and function to raise the level of the doppler frequency signal to a workable level. The level sensor and squaring amplifier 35 comprise a level detecting circuit and a clipping amplifier. Typically, the squaring amplifier includes several stages of amplification with the last stage operating in a saturated mode. Such circuitry is considered to be standard hardware. Similarly, the integrator 38 and a differential comparator 40 are commercially available items. The integrator may comprise an RC circuit and the differential comparator and operational amplifier having two input terminals.

Typically, the correlation channel 48 may be an ultrasonic (acoustic) system responsive to sound waves in a surveillance area. An example of such a system is one manufactured and available from Alertronics (a part of the Walter Kidde Company) identified as Model AC4. The correlation channel 48 receives the appropriate frequency signal on an antenna 48a. Other types of correlation channels may be employed. As will be explained, some such systems employ many of the components shown in FIG. 1.

The type of correlation channel chosen would depend upon the nature of the motion profile, i.e., seismic detector for vehicles in outdoor applications, acoustic detector for indoor motion detection systems, etc. The mixer output of the correlation channel 48 could also use a filter preamplifier similar to preamplifier 28, a level sensor and squaring amplifier similar to amplifier 35, and an integrator similar to integrator 38. The integrator time constants for the two detector channels are chosen such that for a common motion profile, equal-amplitude output levels are developed at the outputs of the two integrators. Thus, when different targets are detected by each channel, the motion profiles will be different, the integrator outputs will not be at the same level, and a positive basis for discrimination against such coincidental occurrences may be established. This again reduces false alarms in the system.

The output of the integrator 38 and the correlation channel 48 are fed to the differential comparator 40 at its inputs and develops a logic ONE at its output on line 42 when the input from the doppler frequency channel is equal to or greater than that from the correlating channel 48. This "greater-than" feature is included to accommodate the case on which the RF background seen by the doppler frequency channel is abnormally high and tends to bias that side of the system above the quiescent condition on the correlating channel.

Normally, the differential comparator 40 will have a logic ONE output (equal inputs generate a logic ZERO output) since its primary function is to eliminate false alarms when the two correlating channels are receiving different targets. The output of the differential comparator 40 is applied to an integrate and hold circuit 43 to introduce a time delay requirement on any alarm signal.

The output on line 44 from the integrate and hold circuit 43 is fed to one input of a NAND gate 51. The other input to the NAND gate 51 is received from the correlating channel level sensor and squaring amplifier (similar to amplifier 35) through an integrate and hold circuit 49. An output of the integrate and hold circuit 49 is fed through a level sensor 52. If the integrate and hold output on line 50 reaches the preset threshold of the level sensor 52, within the timing period of a time-and-reset circuit 45, the sensor 52 will hold a logic ONE until a subsequent timing period occurs in which the integrator output level on line 50 fails to reach the level sensors threshold. Time constants of the integrators 43 and 49, and the time constant of the time-and-reset circuit 45 are set such that the threshold of the level sensor 52 will normally be reached within the prescribed timing period of the time-and-reset circuit 45 only if the correlating channel signal is equal to or greater than that expected from a minimum cross section target at maximum range. The time-and-reset circuit 45 comprises a pulse generating clock that automatically resets after a setable period of time.

The auxiliary correlating level-sensing channel 48 thus provides a logic ONE to the input line 53 of the NAND gate 51 under the aforementioned conditions, which corresponds to a real motion detection. However, if the correlating channel(s) alone has been activated then there will be no signal in the doppler frequency channel, and consequently there results false alarm protection for the correlating channel of the system. Conversely, the auxiliary correlating channel 48 provides the desired false alarm protection for the doppler frequency channel of the system since the NAND 51 will be similarly inhibited if no alarm condition is detected by this correlating back-up feature.

When the NAND 51 receives a logic ONE from the integrate and hold circuit 43 and the level sensor 52, its output on line 54 will initiate an alarm The alarm 55 may also be initiated by the aforementioned self-test monitor 24. Various tamper logic outputs such as case tamper, line tamper, etc., may be connected to the alarm at terminal 56, if desired for system tamper protection.

The split-ring mixer 15 consists of three microstrip segments of radio frequency transmission line interconnected with other mixer components and terminals. The characteristic impedance of all three line segments 70, 72 and 73 is $\sqrt{2}\, Z_o$, where $Z_o$ is the characteristic impedance of the radio frequency system.

Transmission line segment 70 is one-quarter wavelength long at the operating frequency of the oscillator 10 and acts as an impedance transformer between the reference load 71 and input terminal 13. Since line segment 70 has a characteristic impedance $\sqrt{2}\, Z_o$, input terminal 13 sees the reference load 71 as a resistance of $2\, Z_o$ ohms.

Transmission line segment 72 is three-quarters wavelength long at the operating frequency and acts as a phase-inverting impedance transformer between the output terminal 16 and the input terminal 13. Since the transmission line segment 72 has a characteristic impedance $\sqrt{2}\, Z_o$ and since the output terminal 16 is matched, the input terminal 13 sees output terminal 16 as a resistance $2\, Z_o$.

The ends of the transmission line segments 70 and 72 are coupled in a parallel arrangement at input terminal 13. The two transformed resistances of $2\, Z_o$ ohms add in parallel to give $Z_o$ ohms, so that input terminal 13 is matched to the radio frequency systems. The result is that transmission line segments 70 and 72 act as matched, phase-inverting power divider which splits the input power equally between the reference load 71 and the output terminal 16.

Transmission line segment 73 is one-half wavelength long at the operating frequency and has two oppositely polarized detector diodes 74 and 75 connected at points symmetrically displaced about the exact center of line segment 73. Both diodes present a high impedance to the radio frequency energy so that the line segment 73 behaves essentially as an unloaded transmission line. Rectified outputs of the diodes 74 and 75 are filtered by LP filters 76 and 77 and then differentially combined in a tapped load resistance 78. A DC return 79 is provided for the rectified diode currents.

Transmission line segment 73 is the heart of the mixer in that it acts to compare the voltage existing across the reference load 71 with the voltage existing at the output terminal 16. With the transmitter power applied to input terminal 13, and no doppler signal entering the matched output terminal 16, symmetry demands that the voltages across the reference load 71 and the output terminal be equal in magnitude and opposite in phase. There is no current flow into either end of the transmission line segment 73, but there is a sinusoidal voltage distribution along the segment with the zero-crossing at the exact center. Detector diodes 74 and 75 which are symmetrically displaced about the line center see radio frequency voltages of equal magnitude and opposite phase. The voltage magnitude (mixer injection level) for a given transmitter power can be adjusted simply by changing diode displacement, i.e., farther apart for higher level, closer together for lower level.

A doppler signal entering output terminal 16 does not see the same symmetry as the transmitter signal entering input terminal 13. The result is that doppler signals produce a cosinusoidal voltage distribution along transmission line segment 73 so that doppler signal voltages reach a maximum at the line center and do not reverse phase across the center. The requirement for balanced mixing is met, i.e., injection voltages out of phase, signal voltages in phase. The operating principle of a split-ring mixer motion detection system is based upon a circuit arrangement which multiplies the respective transmitted and received voltage magnitudes by even and odd functions of distance along a transmission line. The following analysis of the system operation is simplified by the fact that loading from the diode peak detectors is assumed negligible.

Figure 2:
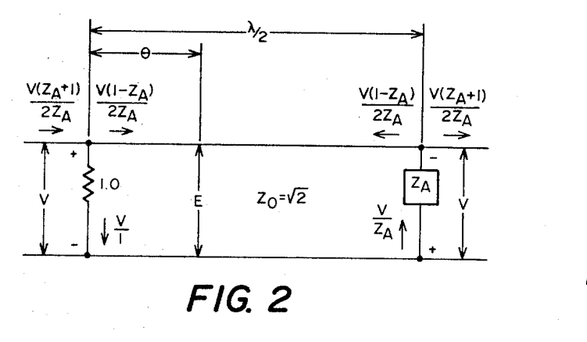
FIG. 2 is a schematic of an equivalent circuit for operational analysis of the split-ring doppler detector of FIG. 1.

With reference to FIG. 2, the impedance level has been normalized to one-ohm and the one-half wavelength line section containing the mixer port has been isolated. Voltages, and currents have been assigned according to constraints of a one-half wavelength line, i.e., end magnitudes are equal but end phases differ by 180°. Using the relation for voltage along a line, the voltage E at any point is given by:

$$E = V\cos\theta - jV\sqrt{2}\sin\theta\,[1 - Z_a/2Z_a]$$

where:
$V$ = voltage at antenna port,
$\theta$ = electrical distance from matched port,
$Z_a$ = antenna impedance.

Next, the impedance concept of a CW doppler target must be utilized. For a monostatic system, a target some distance X from the antenna reflects a voltage $V_1$ back into the transmission line according to:

$$V_1 = (KV/X^2)e - (j4\pi X/\lambda) \quad (2)$$

where K is a small constant and V is the CW voltage applied to the antenna. If the target moves at a speed S:

$$X = St \quad (3)$$

and the result is a time-varying reflection coefficient $\Gamma$ given by:

$$\Gamma = (K/S^2t^2)e - (j4\pi St/\lambda) \quad (4)$$

Since the doppler frequency $f$ is given by:

$$f = 2S/\lambda \quad (5)$$

then, $$\Gamma = (K/S^2t^2)e - j2\pi ft \quad (6)$$

The required substitutions lead to the desired expression for RF voltage magnitude along the half wavelength line section in question:

$$E \approx V2[1 - (\sqrt{2}K\tan\theta/S^2t^2)\sin 2\pi ft] \quad (7)$$

This will be recognized as amplitude modulation at the doppler frequency with a modulation percentage given by:

Modulation Percentage = $(\sqrt{2}K\tan\theta/S^2t^2) \times 100\%$ (8)

Since the diodes are symmetrically located about the 90° position, the sign of $\tan\theta$ reverses and the requirement for balanced mixing is met. Also, increasing the available transmitter power makes it necessary to move both diodes closer to 90° in order to maintain a constant injection level. It follows that the modulation percentage automatically increases, due to the increased magnitude of $\tan\theta$.

Figures 3A, 3B, 3C, 4A, 4B, 4C:
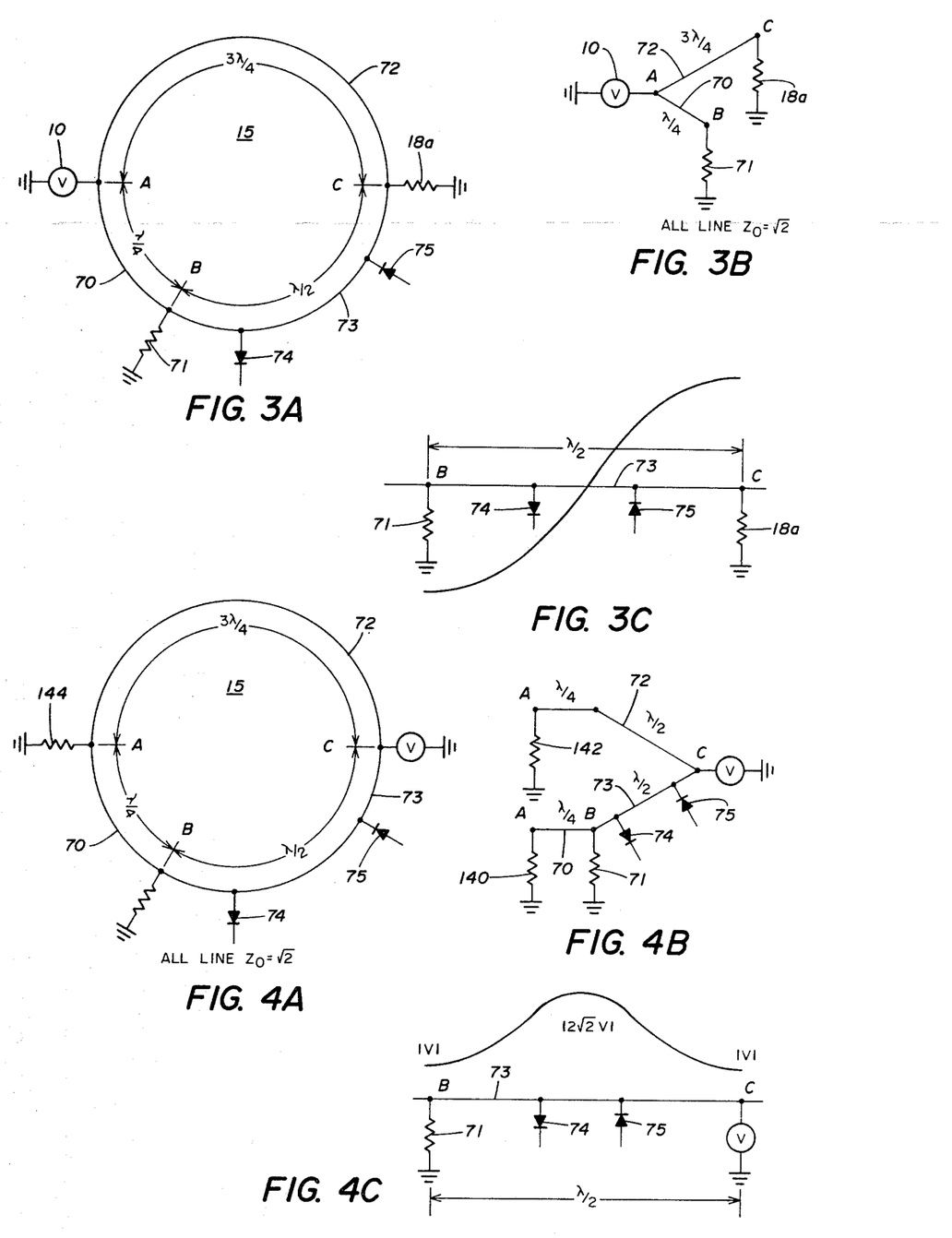
FIGS. 3A, 3B and 3C are schematics of a split-ring doppler detector in a transmit mode.
FIGS. 4A, 4B and 4C are schematics of a split-ring doppler detector in a receive mode.

Referring to FIGS. 3A, 3B and 3C, there is shown an equivalent circuit schematic of a split-ring detector where the characteristic impedance has been normalized to 1-ohm. The ring constitutes a matched power splitter because the one-quarter wavelength transmission line 70 and the three-quarter wavelength transmission line 72 transform the 1-ohm matched loads 71 and 18a to 2-ohms at point A. The oscillator 10 sees both 2-ohm loads in parallel, hence the input impedance is also matched. Since the three-quarter wavelength transmission line 72 differs from the one-quarter wavelength transmission line 70 by one-half wavelength, it phase-inverts the wave at point A, as well as transforms the load 18a. The result is that matched loads 71 and 18a, coupled at points B and C, respectively, receive voltages of equal magnitude but opposite phase as illustrated in FIG. 3B and by the wave form of FIG. 3C. As a result, a one-half wavelength transmission line may be connected between points B and C without affecting the matched circuit operation. This one-half wavelength transmission line 73 completes the split-ring detector and has coupled thereto diode detectors 74 and 75. As illustrated in FIG. 3C, where one-half wavelength transmission line 73 is shown as a straight line. During the transmit mode, the RF oscillator 10 output voltage distribution is an odd function of length along this transmission line section.

Referring to FIGS. 4A, B and C, there is shown an equivalent circuit schematic of the split-ring detector 15 in a receive mode, again where the characteristic impedance has been normalized to 1-ohm. Transmission line sections 70 and 73 are of particular significance in operation in the receive mode. The one-quarter wavelength transmission line 70 transforms the 2-ohm load 140 down to a 1-ohm load. The 2-ohm load 140 and the 2-ohm load 142 are the equivalent of the 1-ohm load at 144 if the two points A of FIG. 4B are joined as shown in FIG. 4A. The 1-ohm load transformed by the one-quarter wavelength transmission line 70 is in parallel with the 1-ohm load 71, coupled at point B, resulting in an effective one-half ohm load. This produces a voltage standing wave ratio (VSWR) of $2\sqrt{2}$ in the equivalent circuit of FIG. 4B. An even length function of signal voltage amplitude is produced as shown in FIG. 4C. This is in contrast to the RF oscillator 10 output voltage distribution shown in FIG. 3C as an odd function.

With the detector diodes 74 and 75 coupled symmetrically about the zero crossing of the odd function of FIG. 3C, when the even function in the receive mode occurs across the one-half wavelength transmission line 73, the detector diodes now receive a voltage of equal magnitude and in phase. Operation of the splitring detector is based upon the combination of the even and odd voltage distributions appearing across the one-half wavelength transmission line 73, when in the transmit and receive modes.

Figures 5, 6, 7:
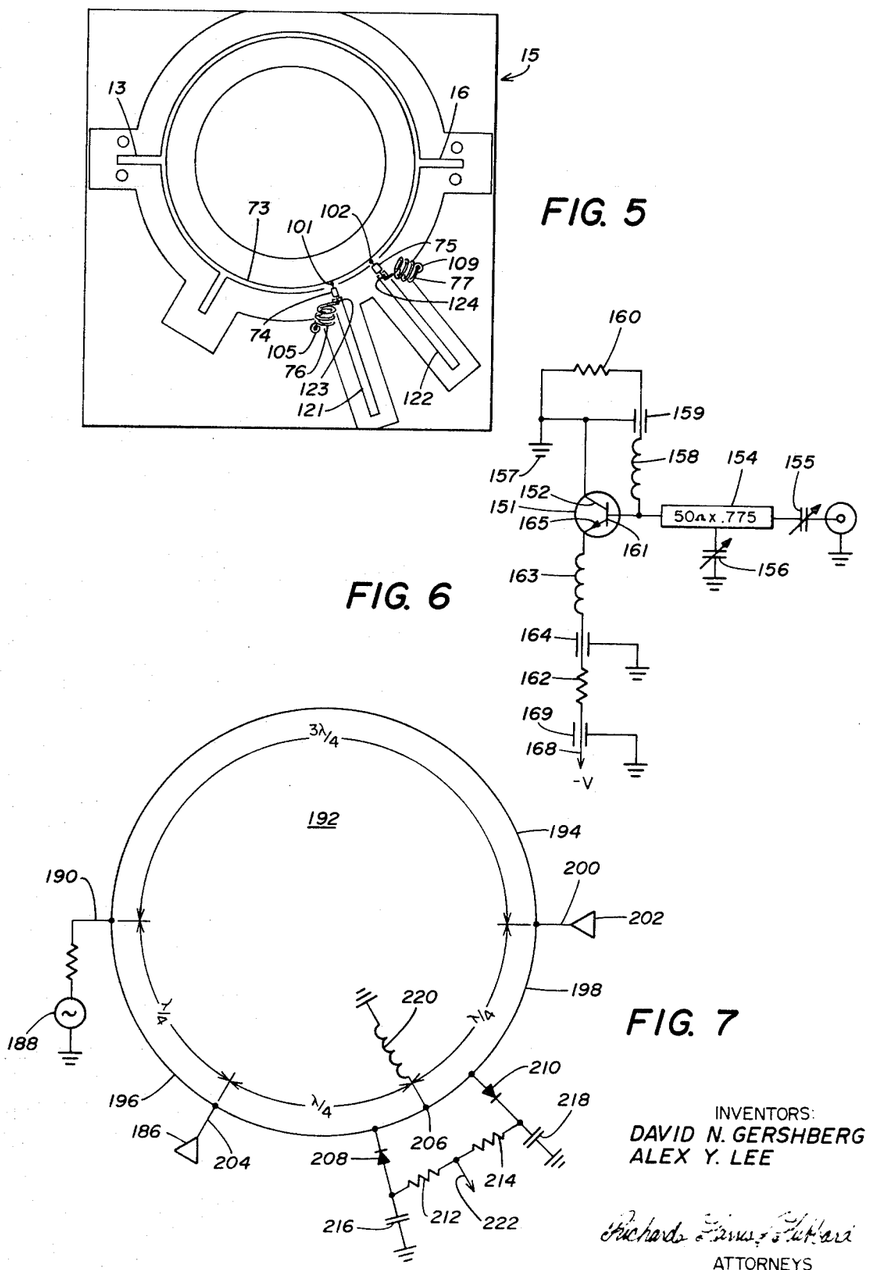
FIG. 5 is a plan view of a microstrip split-ring detector in accordance with the present invention.
FIG. 6 is a schematic of a radio frequency oscillator for use in the system of FIG. 1.
FIG. 7 is a schematic of a split-ring detector wherein doppler frequency signals are received on a pair of antenna elements.

Referring now to FIG. 5, the split-ring detector mixer 15 is illustrated. Considering first the split-ring detector mixer 15, the input transmission line 13 and the output line 16 are microstrip transmission lines having a characteristic impedance of 50 ohms. The split-ring mixer 15 is made up of an etched double clad printed circuit board of the commercially available Teflon dielectric type. The conductor on one side of the board comprises a ground plane conductor (not shown) and the other making up the other conductors of the splitring mixer 15. The diodes 74 and 75 are a matched pair selected for their similarity in characteristics. The diodes are connected in series with open circuited stubs 121 and 122. At the junctures 123 and 124 between the diodes 74 and 75 respectively and the open circuited stubs are connected low-pass filters 76 and 77 consisting of inductors connected between the points 123 and 124 and the opposite ends 105 and 109 of the potentiometer 78 (see FIG. 1). A pair of capacitors 131 and 132 (FIG. 1), respectively, connected between the points 105 and 109 and ground, are also part of the filters 76 and 77, respectively. The diodes 74 and 75 are coupled into the transmission line 73 at points 101 and 102, respectively, to complete the diode detector circuit.

The band pass filter 17 is a shorted stub resonator selected to be of such a length as to be resonant at the selected center of frequency of the oscillator 10. This filter 17 will appear as a very high shunt impedance to signals at the center of frequency.

The output 80 of the mixer 15 is connected through a 50 ohm transmission line to the transmit-receive antenna 18 which is matched to the 50 ohm line. The input 13 of the mixer 15 is connected to the RF oscillator 10.

As will be clearly understood from FIG. 1, the AC signal at the output 22 of the detector mixer 15 is passed through the capacitor 133 and the active filter doppler preamplifier 28 to eliminate all but the desired doppler frequency from the output of the amplifier 28, and to feed these doppler frequency signals to the level sensor and squaring amplifier 35, where they are blocked to a square wave of doppler frequency and fed to the remainder of the processing circuitry.

Referring to FIG. 6, there is shown the oscillator 10 which may also be constructed using microstrip techniques.

The oscillator 10 including an NPN transistor 151 having a collector electrode 152 connected to ground 157. The base electrode 161 connects through a microstrip inductor 154 to variable capacitor 155. A second variable capacitor 156 is tapped to inductor 154 and connected to ground. The inductor 154 is etched into the same printed circuit board as the split-ring mixer 15. It has been found that inductors constructed in this manner exhibit excellent temperature stability. It is noted that the ground point 157 in the diagram of FIG. 6 represents an extension of the ground plane conductor in the split-ring mixer 15. Furthermore, the ground plane of the split-ring mixer 15 which connects to the antenna 18 is an extension of this ground line.

The base 161 of the transistor 151 is also connected through an inductor 158 to the junction of a capacitor 159 which in turn connects to resistor 160 to provide proper filtering and bias for the base of the transistor 151. The emitter electrode 165 of the transistor 151 is connected to resistor 162 through an inductor 163. The junction of inductor 163 and resistor 162 are also connected through a capacitor 164 to complete the bias and filtering circuitry. The node 168 is connected to the negative terminal of an output of a power supply through a low-pass filter consisting of a capacitor 169 connected between the power supply output 168 and ground.

Referring to FIG. 7, there is shown a modification of a detector mixer wherein the reference load 71 is replaced with a second transmit/receive antenna 186. An RF oscillator 188 generates a frequency signal on an input line 190 to a mixer 192 consisting of a three-quarter wavelength transmission line 194, a one-quarter wavelength transmission line 196 and a one-half wavelength transmission line 198. The transmission line 194 terminates at an output line 200 coupled to a transmit/receive antenna 202. The transmission line 196 is in a parallel arrangement with the transmission line 194 and terminates at an output line 204 coupled to the transmit/receive antenna 186. Coupled between the transmission lines 196 and 194 is the one-half wavelength transmission line 198. Symmetrically disposed about a center point 206 are detector diodes 208 and 210, each coupled to opposite ends of a resistance network including resistors 212 and 214. A capacitor 216 is coupled to the anode of the diode 208 and ground. Similarly, a capacitor 218 is coupled between the cathode of the diode 210 and ground. A DC return for the detector network is provided by means of an inductor 220 coupled to ground. The detector mixer output signal appears on a line 222 and is applied to the input of an active doppler preamplifier, similar to the preamplifier 28 of FIG. 1.

Combining these two antennas as an array in a motion detector system results in transmission on a spatial difference pattern and reception on a spatial sum pattern. This may not be too desirable in all applications, since most transmitter power is radiated in directions coinciding with nulls in the receiving pattern. However, if the two antennas 186 and 202 do not "see" each other (i.e., large physical separation, placement on opposite sides of a large shield, etc.) the two antennas provide satisfactory operation with a single-ring mixer. This effectively doubles the coverage area of a single RF motion detector system. That is, the antenna 186 covers one given surveillance area and the antenna 202 covers a second given surveillance area.

Operationally, the two antenna system modification of FIG. 7 is similar to that described with reference to FIG. 1. Whenever one or the other of the antennas 186 or 202 receives a motion signal the alarm 55 is actuated, assuming the respective correlation channel for that given surveillance area also receives a motion indication signal.

While several embodiments of the invention, together with modifications thereof, have been described in detail herein and shown in the accompanying drawings, it will be evident that various further modifications are possible without departing from the scope of the invention.

What is claimed is:

1. In a doppler frequency motion detector system having a transmitter generating electromagnetic energy at a radio frequency for an antenna radiating the generated energy throughout a given surveillance area and receiving energy reflected by objects within the area, and wherein movement within the surveyed area produces an alarm from an indicator responsive to the output of a doppler frequency amplifier connected to a detector mixer that receives energy from said antenna, the detector mixer comprising:

a first transmission line having a length related to the wavelength of the generated electromagnetic energy, said first transmission line connected between said transmitter and said antenna, a second transmission line with a length on the order of one-third of the length of said first transmission line and joined thereto at said transmitter in parallel therewith, a third transmission line with a length on the order of two-thirds the length of said first transmission line and joined thereto at said antenna and to said second transmission line, and a pair of detector elements coupled to said third transmission line at points symmetrically placed about a transmit frequency voltage wave distribution zero-crossing, wherein signals from said detector elements are differentially combined and interconnect to the doppler frequency amplifier.

2. In a doppler frequency motion detector system as set forth in claim 1 wherein the length of said first transmission line equals three-quarters wavelength of the generated electromagnetic energy.

3. In a doppler frequency motion detector system as set forth in claim 1 including a reference load coupled to said second transmission line at the point of joining with said third transmission line.

4. In a doppler frequency motion detector system as set forth in claim 1 wherein the characteristic impedance of each of said three transmission lines equals $\sqrt{2}\,Z_0$, where $Z_0$ equals the characteristic impedance of said transmitter.

5. In a doppler frequency motion detector system as set forth in claim 1 including a pair of low-pass filters, one connected to each of said detector elements.

6. In a doppler frequency motion detector system as set forth in claim 1 wherein said detector elements comprise a pair of reverse connected diodes.

7. In a doppler frequency motion detector system wherein movement within a given surveillance area produces an alarm from an indicator responsive to a doppler frequency signal, comprising:

a transmitter for generating electromagnetic energy at a radio frequency, an antenna for radiating said energy throughout said area and for receiving radiated energy as reflected by objects within said area, a detector mixer including:
 a. a first transmission line having a a length related to the wavelength of the generated energy and connected between said transmitter and said antenna,
 b. a second transmission line with a length on the order of one-third the length of said first transmission line and joined thereto at said transmitter in parallel therewith,
 c. a third transmission line with a length on the order of two-thirds the length of said first transmission line and joined thereto at said antenna and to said second transmission line, a pair of detector elements coupled to said third transmission line at points symmetrically placed about a transmit frequency voltage wave distribution zero-crossing to generate doppler frequency signals from energy reflected to said antenna, doppler frequency responsive means including a differential comparator with one input responsive to the doppler frequency signals differentially combined from said detector elements, means for generating a correlation signal to the second input of said differential comparator to provide improved motion detector reliability, and circuit means responsive to the output means of said differential comparator for generating a correlation signal to generate a motion signal to said indicator.

8. In a doppler frequency motion detector system as set forth in claim 7 wherein the length of said first transmission line equals three-quarters wavelength of the generated energy and the characteristic impedance of each of said three transmission lines equals $\sqrt{2}\,Z_0$, where $Z_0$ equals the characteristic impedance of said transmitter.

9. In a doppler frequency motion detector system as set forth in claim 8 wherein said detector mixer includes a pair of low-pass filters, one connected to each of said detectors.

10. In a doppler frequency motion detector system as set forth in claim 9 wherein said detector mixer further includes a reference load coupled to said second transmission line at the point of joining with said third transmission line.

11. In a doppler frequency motion detector system as set forth in claim 7 including a second antenna for radiating said energy throughout a second surveillance area and for receiving radiated energy as reflected by objects within said second area, said second antenna coupled to said second transmission line at the point of joining with said third transmission line.

12. A detector circuit for producing at the output thereof a doppler frequency signal from oppositely travelling waves at an antenna connected thereto, said detector comprising:

phase inverting, power-divider means coupled to said antenna element, a reference load coupled to said divider means at a point to split the power of an input signal applied to said divider means equally between said reference load and the antenna element, a pair of detector elements coupled to said divider means at points symmetrically displaced about a transmit frequency voltage wave distribution zero-crossing, and circuit means for differentially combining the detector element signals to produce a detector output doppler frequency signal.

13. In a detector circuit as set forth in claim 12 including circuit means for coupling a D.C. current through said detector elements to ground.

14. A detector circuit as set forth in claim 12 wherein said divider means includes three interconnected transmission line segments each with a characteristic impedance equal to $\sqrt{2}\,Z_0$, where $Z_0$ equals the characteristic impedance of a transmitter supplying input power.

15. A detector circuit as set forth in claim 13 wherein a first of said transmission lines has a length equal to three-quarter wavelengths of an input frequency signal applied to said detector, a second of said transmission lines has a length equal to one-third that of said first transmission line and the third of said transmission lines has a length equal to two-thirds of said first transmission line.

16. A detector circuit as set forth in claim 12 including a pair of low-pass filters, one connected to each of said detectors.

* * * * *